United States Patent
Sugiura

(10) Patent No.: US 10,008,718 B2
(45) Date of Patent: Jun. 26, 2018

(54) POSITIVE ELECTRODE ACTIVE MATERIAL FOR USE IN LITHIUM ION SECONDARY CELL

(71) Applicant: TOYOTA JIDOSHA KABUSHIKI KAISHA, Toyota-shi, Aichi (JP)

(72) Inventor: Ryuta Sugiura, Toyohashi (JP)

(73) Assignee: TOYOTA JIDOSHA KABUSHIKI KAISHA, Toyota-shi, Aichi (JP)

(*) Notice: Subject to any disclaimer, the term of this patent is extended or adjusted under 35 U.S.C. 154(b) by 0 days. days.

(21) Appl. No.: 15/363,500

(22) Filed: Nov. 29, 2016

(65) Prior Publication Data

US 2017/0155134 A1 Jun. 1, 2017

(30) Foreign Application Priority Data

Nov. 30, 2015 (JP) ................................ 2015-234123

(51) Int. Cl.
| | |
|---|---|
| *H01M 4/36* | (2006.01) |
| *H01M 4/131* | (2010.01) |
| *H01M 4/505* | (2010.01) |
| *H01M 4/525* | (2010.01) |
| *H01M 4/62* | (2006.01) |

(52) U.S. Cl.
CPC ........... *H01M 4/366* (2013.01); *H01M 4/131* (2013.01); *H01M 4/505* (2013.01); *H01M 4/525* (2013.01); *H01M 4/628* (2013.01)

(58) Field of Classification Search
CPC ...... H01M 4/366; H01M 4/131; H01M 4/505; H01M 4/525; H01M 4/628
See application file for complete search history.

(56) References Cited

U.S. PATENT DOCUMENTS

| | | | | | |
|---|---|---|---|---|---|
| 5,443,929 | A | * | 8/1995 | Yamamoto | ............ H01M 4/131 429/224 |
| 5,869,208 | A | * | 2/1999 | Miyasaka | ............. H01M 4/131 429/215 |
| 6,558,844 | B2 | * | 5/2003 | Howard, Jr. | .......... H01M 4/131 423/599 |
| 2001/0053480 | A1 | | 12/2001 | Koga et al. | |

FOREIGN PATENT DOCUMENTS

| | | |
|---|---|---|
| JP | 2000-235858 A | 8/2000 |
| JP | 2001-202960 A | 7/2001 |
| JP | 2001-266879 A | 9/2001 |

OTHER PUBLICATIONS

Yingbin Lin, et al., "Enhanced electrochemical performances of $LiNi_{0.5}Mn_{1.5}O_4$ by surface modification with superconducting $YBa_2Cu_3O_7$", Journal of Power Sources, Mar. 6, 2014, pp. 188-194, vol. 259.

* cited by examiner

*Primary Examiner* — Laura Weiner
(74) *Attorney, Agent, or Firm* — Sughrue Mion, PLLC

(57) ABSTRACT

The positive electrode active material for use in a lithium ion secondary cell disclosed herein includes: a base portion formed of a lithium transition metal complex oxide capable of occluding and releasing lithium ions; and a coating portion formed on at least part of a surface of the base portion, the coating portion being formed of an electrically conductive oxide with a perovskite structure including, as constituent elements, cobalt and at least one of manganese and nickel.

2 Claims, 1 Drawing Sheet

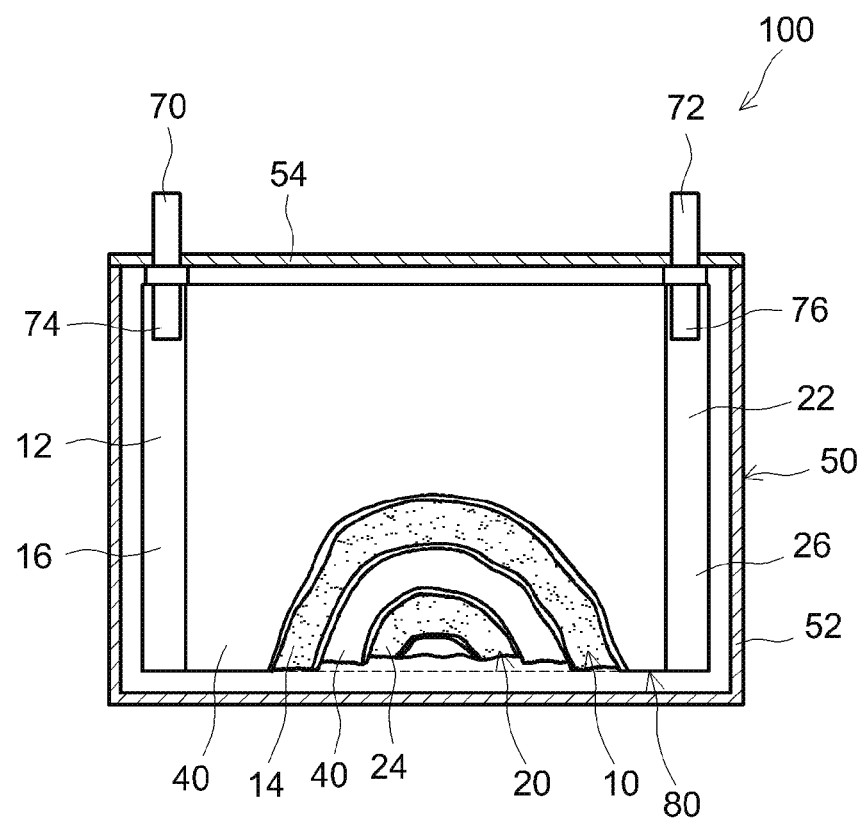

POSITIVE ELECTRODE ACTIVE MATERIAL FOR USE IN LITHIUM ION SECONDARY CELL

CROSS-REFERENCE

The present application claims priority to Japanese Patent Application No. 2015-234123 filed on Nov. 30, 2015, the entire contents of which are incorporated by reference in the present description.

BACKGROUND OF THE INVENTION

1. Field of the Invention

The present invention relates to a lithium ion secondary cell, and more specifically to a positive electrode active material for a lithium ion secondary cell.

2. Description of the Related Art

Lithium ion secondary cells are low in weight and make it possible to obtain a high energy density. For this reason, such cells have been widely used as portable power sources for personal computers, portable terminals, etc. and also as drive power sources for vehicles.

Among these applications, lithium ion secondary cells that are used as drive power sources for vehicles need to be charged or discharged at a high current (high rate) over a very short period of time. Therefore, as one of the performances required in particular for lithium ion secondary cells to be used as drive power sources for vehicles, there is durability (cycle characteristic), that is, the ability to maintain good cell performance even in a usage state in which high-rate charging and discharging are repeatedly performed over a long period of time.

Research and development have been heretofore conducted from various angles to improve the durability. One of approaches involved the investigation of configuration (composition) and structure of positive electrode active materials to be used in the lithium ion secondary cells.

For example, as an example of the such a technique, Japanese Patent Application Publication No. 2001-266879 discloses a positive electrode active material (surface-coated positive electrode active material), other than a Co-containing active material, characterized in that the surface of the positive electrode active material is coated with a predetermined electrically conductive oxide, this positive electrode active material being an alternative to Co-containing active materials. Japanese Patent Application Publication No. 2001-266879 indicates that by providing such a coating, it is possible to improve the cycle characteristic over that of a positive electrode active material in a non-coated state.

Further, Journal of Power Sources, Vol. 259, pp 188-194, 2014, discloses, as one of surface-coated positive electrode active materials, a surface-coated positive electrode active material in which the surface of a positive electrode active material made of a $LiNi_{0.5}Mn_{1.4}O_4$ with a spinel structure is coated with $YBaCu_3O_7$ which is a superconductor. It is also indicated that such a coating makes it possible to suppress the outflow of a transition metal from the positive electrode active material placed in a nonaqueous electrolytic solution.

SUMMARY OF THE INVENTION

However, the inventors have confirmed that the surface-coated positive electrode active material of the configuration disclosed in Japanese Patent Application Publication No. 2001-266879 has a comparatively high temperature increase rate at the time of overcharge, and from the standpoint of structural stability of the active material, there is still room for improvement. Further, the positive electrode active material disclosed in Journal of Power Sources, Vol. 259, pp 188-194, 2014 has a very unusual combination of the composition of the active material serving as a base and the coating substance, this combination being unsuitable for practical use.

Accordingly, the present invention is aimed at improving the performance of a lithium ion secondary cell on the basis of the approach focused on the improvement of the surface-coated positive electrode active material, such as disclosed in Japanese Patent Application Publication No. 2001-266879, and it is an object of the present invention to provide a lithium ion secondary cell demonstrating good cycle characteristic (durability) and a positive electrode active material for such a cell.

The inventors have conducted a comprehensive research of the interaction of positive electrode active materials suitable for lithium ion secondary cells and substances for coating the surface of the active material. It was thus found that the increase in temperature of a lithium ion secondary cell at the time of overcharge can be suppressed and, at the same time, gas generation inside the cell in repeated high-rate charging and discharging can be also suppressed by using a positive electrode active material in which at least part of the surface is coated with an electrically conductive oxide with a perovskite crystal structure (referred to hereinbelow simply as "perovskite structure") that includes cobalt (Co) and at least one of manganese (Mn) and nickel (Ni) (that is, an oxide with a perovskite crystal structure that functions as an electron conductor or ion conductor). This finding led to the creation of the present invention.

The positive electrode active material provided by the present invention is a positive electrode active material for use in a lithium ion secondary cell, including a base portion formed of a lithium transition metal complex oxide capable of occluding and releasing lithium ions, and a coating portion formed on at least part of a surface of the base portion.

The coating portion is formed of an electrically conductive oxide with a perovskite structure including, as constituent elements, (1) cobalt (Co) and (2) at least one of manganese (Mn) and nickel (Ni).

In the positive electrode active material of such a configuration, at least part of the surface of the positive electrode active material is coated with an electrically conductive oxide with a perovskite structure including, as constituent elements, Co and at least one of Mn and Ni (typically, Co and Mn are included, or Co and Ni are included). As a result, in a lithium ion secondary cell including such positive electrode active material in a positive electrode (more specifically, a positive electrode active material layer), the increase in cell temperature at the time of overcharge can be suppressed.

Furthermore, the generation of gas can be suppressed even when charging and discharging at a comparatively high rate are performed repeatedly (for example, charging and discharging at a high temperature and a rate above 1 C).

Therefore, with the lithium ion secondary cell including the positive electrode active material disclosed herein as a positive electrode, it is possible to provide a lithium ion secondary cell that excels in a high-rate characteristic and demonstrates good cycle characteristic.

In an embodiment of the positive electrode active material for a lithium ion secondary cell disclosed herein, the coating portion is characterized by including an electrically conductive oxide with a perovskite structure which is represented by the following general formula:

$ACo_xM_{1-x}O_{3-\delta}$.

In the formula, A is at least one element selected from among rare earth elements and alkaline earth metal elements, M is at least one of manganese and nickel, x is a real number satisfying 0<x<1, and δ is an oxygen deficiency value for obtaining electrical neutrality.

As a result of configuring the coating portion of the electrically conductive oxide with a perovskite structure which is represented by such general formula, the suppression of increase in cell temperature at the time of overcharge and the suppression of gas generation during high-rate charging and discharging can be realized more advantageously.

In the embodiment disclosed herein, the coating portion is characterized by including the electrically conductive oxide with a perovskite structure which is represented by the following general formula:

$ACo_xMn_{1-x}O_{3-\delta}$.

In the formula, A is at least one element selected from among rare earth elements and alkaline earth metal elements, x is a real number satisfying 0.1≤x≤0.5, and δ is an oxygen deficiency value for obtaining electrical neutrality.

As a result of configuring the coating portion of the electrically conductive oxide which is represented by such general formula and has Mn as a constituent element, it is possible to suppress greatly the increase in cell temperature at the time of overcharge, while suppressing satisfactorily the generation of gas during high-rate charging and discharging.

BRIEF DESCRIPTION OF THE DRAWINGS

FIG. 1 illustrates schematically the internal configuration of a lithium ion secondary cell according to one embodiment.

DETAILED DESCRIPTION OF THE INVENTION

An embodiment of the lithium ion secondary cell disclosed herein and a positive electrode active material for this secondary cell will be explained hereinbelow. Features other than those specifically described in the present specification, but necessary for implementing the present invention can be considered as design matters for a person skilled in the art that are based on the conventional techniques in the pertinent field. In the lithium ion secondary cell provided by the present invention, the structure and composition of the cell and positive and negative electrodes themselves are not limited to those of the lithium ion secondary cell explained in the embodiments hereinbelow, provided that the positive electrode is provided with any of the positive electrode active materials disclosed herein.

In the present specification, the "lithium ion secondary cell" is a secondary cell which uses lithium ions as electrolyte ions contained in an electrolyte (typically, a liquid or solid nonaqueous electrolyte) and in which electric conduction is realized by the lithium ions present between the positive and negative electrodes. Further, the "positive electrode active material" or "negative electrode active material" is a material (positive electrode active material or negative electrode active material) capable of reversibly occluding and releasing chemical species (that is, lithium ions) which are charge carriers.

As depicted in FIG. 1, a lithium ion secondary cell 100 according to the present embodiment is provided with a metal case 50. This case (outer container) 50 is provided with a case main body 52 in the form of a flat rectangular parallelepiped opened at the upper end and a lid 54 that closes the opening. The cell case itself is not necessarily made of a metal, and a resin film or a laminated film can be also advantageously used.

In the case 50 depicted in FIG. 1, a positive electrode terminal 70 which is electrically connected to a positive electrode 10 of a wound electrode body 80 and a negative electrode terminal 72 which is electrically connected to a negative electrode 20 are provided on the upper surface of the case (that is, on the lid 54). The flat-shape wound electrode body 80 obtained by laminating the elongated sheet-shaped positive electrode (positive electrode sheet) 10, the elongated sheet-shaped negative electrode (negative electrode sheet) 20 together with a total of two elongated sheet-shaped separators (separator sheets) 40 and winding the laminate is housed together with a nonaqueous electrolyte (in this case, a nonaqueous electrolytic solution) inside the case 50.

A gas discharge mechanism, such as a safety valve, for releasing the gas generated inside the case 50 to the outside of the case 50 is provided in part of the case 50 in the same manner as in the conventional lithium ion secondary cells of this type. However, this mechanism does not characterize the present invention and, therefore, the depiction thereof in the drawings and the explanation thereof are omitted.

In the positive electrode sheet 10, a positive electrode active material layer 14 including the positive electrode active material as the main component is provided on both surfaces of an elongated sheet-shaped positive electrode collector 12. However, the positive electrode active material layer 14 is not provided at one side edge in the lateral direction (that is, one end portion in the winding axis direction), which is the direction perpendicular to the longitudinal direction of the positive electrode sheet 10, and a positive electrode active material layer non-formation portion 16 in which the positive electrode collector 12 is exposed over a certain width is formed. The positive electrode active material will be explained hereinbelow in greater detail.

The positive electrode active material disclosed herein includes a base portion (that is, the main body portion of the positive electrode active material) which is formed of a lithium transition metal complex oxide capable of occluding and releasing lithium ions, and a coating portion (that is surface-attached portion of the positive electrode active material) which is formed on at least part of the surface of the base portion.

The coating portion is characterized by being configured of an electrically conductive oxide with a perovskite structure (also referred to hereinbelow shortly as "coating portion-constituting oxide") which includes (1) cobalt (Co) as a first mandatory constituting metal element and (2) at least one of manganese (Mn) and nickel (Ni) as a second mandatory constituting metal element. Other metal elements (Fe, Ti, etc.) and nonmetal elements (P, N, S, etc.) may be also included, as long as the object of the present invention is attained.

The coating portion as referred to herein indicates a portion that is attached to part of the surface of the active material particles constituting the main body portion of the positive electrode active material, and the bonding form of the attached coating portion-constituting oxide and the active material base portion (main body portion) is not limited.

A method for forming the coating portion is not particularly limited. Typically, the target coating portion formed of an electrically conductive oxide with a perovskite structure can be easily formed on the surface of positive electrode active material (main body portion) particles from a starting material (precursor substance) by attaching the starting material (precursor substance) for forming the coating portion-constituting oxide to the surface of the positive electrode active material (main body portion) particles which have been prepared in advance, and then heating (calcining) under oxidation conditions.

The presence of the coating portion formed on the surface of the positive electrode active material particles (base portion, that is, main body portion) and the elemental composition thereof can be confirmed by a variety of the conventional method. For example, the coating portion can be detected by enclosing the positive electrode active material particles or positive electrode active material layer in a resin, preparing a sample for STEM observations of a particle cross section by focused ion beam (FIB) processing, and performing STEM observations. Further, a spot-type quantitative analysis can be performed using a scanning transmission electron microscopy-energy dispersive X-ray analyzer (STEM-EDX). Alternatively, methods such as SIMS (secondary ion mass spectrometry), XPS (X-ray photoelectron spectroscopy), XRD (X-ray diffraction), and XRF (fluorescent X-ray analysis) may be used.

The positive electrode active material which is used in a lithium ion secondary cell is a substance which tends to expand and contract during charging and discharging. Therefore, one approach to increasing the durability of lithium ion secondary cells is to increase the structural stability of the positive electrode active material during charging and discharging. In this regard, an electrically conductive oxide having a perovskite structure has an advantageous flex resistance. Therefore the structural stability of the positive electrode active material particles can be increased by forming the coating portion from such an electrically conductive oxide. Further, the occurrence of cracks in some of the positive electrode active material particles during charging and discharging and the peeling of some of the positive electrode active material particles from the positive electrode active material layer 14 can be suppressed. Therefore, as a result of providing the coating portion formed of an electrically conductive oxide having a perovskite structure, it is possible to suppress structural changes in the positive electrode active material particles during charging and discharging and the increase in internal resistance of the cell caused by the collapse of crystal structure.

Further, since the positive electrode active material particles can be prevented from peeling off from the positive electrode active material layer 14, the reaction between the peeled electrode active material and a nonaqueous electrolyte can be suppressed. Therefore, the increase in temperature at the time of overcharge can be suppressed.

Further, the coating portion-constituting oxide disclosed herein includes cobalt (Co) as the first mandatory constituent metal element. With the electrically conductive oxide with a perovskite structure that includes Co, the movement of constituent elements between the base portion (main body portion) and the coating portion of the positive electrode active material can be suppressed and the collapse of the crystal structure of the surface of the positive electrode active material (base portion) and the coating portion can be prevented. Therefore, as a result of providing the coating portion formed of the electrically conductive oxide with a perovskite structure that includes Co, it is possible to suppress more effectively the increase in internal resistance of the cell caused by the structural collapse of the positive electrode active material.

The electric conductivity of the electrically conductive oxide with a perovskite structure that includes Co depends on temperature, and the electric conductivity increases at a lower temperature within a temperature range in which the cells are generally used. Therefore, the effect of suppressing the increase in cell resistance is further increased in a low-temperature range.

Co can be stably present with a valence from 2 to 4. As a result, with the electrically conductive oxide with a perovskite structure that includes Co, a structurally stable coating portion can be formed regardless of the type of the crystal structure of the base portion of the positive electrode active material (layered rock-salt structure, rock-salt structure, spinel structure, perovskite structure, and the like). Therefore, the positive electrode active material particles having the coating portion formed of the electrically conductive oxide with a perovskite structure that includes Co can maintain the structure comparatively stably even during heating in a high-temperature range and mechanical treatment such as mechanochemical treatment. Since Co mainly acts at an interface, the abovementioned effect can be demonstrated even at a comparatively small amount of Co.

Further, the coating portion-constituting oxide disclosed herein includes at least one of manganese (Mn) and nickel (Ni) as the second mandatory constituent metal element. With the electrically conductive oxide with a perovskite structure that includes Mn and/or Ni in addition to Co, it is possible to suppress the generation of gas inside the cell case 50 under high-temperature conditions (for example, at 60° C. or higher).

More specifically, with the electrically conductive oxide with a perovskite structure that includes Co, the desorption of oxygen tends to become comparatively large under high-temperature conditions and high-potential conditions. The desorbed oxygen can enhance the generation of gas by oxidation-induced decomposition of the nonaqueous electrolyte. However, as a result of additionally including Mn and/or Ni in the electrically conductive oxide with a perovskite structure that includes Co, the crystal structure stability is further increased and the desorption of oxygen is suppressed even under the high-temperature conditions and high-potential conditions. This is apparently why the effect of suppressing the generation of gas can be obtained.

A complex oxide represented by the following general formula $$ACo_xMn_{1-x}O_{3-\delta}$$

can be used as the electrically conductive oxide with a perovskite structure that constitutes the coating portion (coating portion-constituting oxide). In this formula, δ is an oxygen deficiency value for obtaining electrical neutrality, in the same manner as when a complex oxide with a perovskite-type crystal structure is typically represented by a general formula. It is to be understood by a person skilled and the art, and requires no explanation, that although the number of oxygen atoms in the formula in the explanation of test examples presented hereinbelow is shown, in a simple manner, as $O_3$, this is synonymous to $O_{3-\delta}$, and does not indicate that δ is always zero.

Further, in the formula, A is at least one element selected from among rare earth elements and alkaline earth metal elements. Examples of constituent elements of the A site are lanthanum (La), yttrium (Y), scandium (Sc), cerium (Ce), strontium (Sr), and calcium (Ca). The preferred among them are La and Sr.

Meanwhile, at least one of Mn and Ni is included, in addition to Co, in the so-called B sites in the complex oxide represented by the abovementioned formula. Here, x which specifies the atomic ratio of Co and Mn and/or Ni is a real number satisfying $0<x<1$, for example, $0.01 \leq x \leq 0.8$.

For example, where Co and Mn are in the B sites ($ACo_xMn_{1-x}O_{3-\delta}$), x is typically $0.1 \leq x \leq 0.5$.

Alternatively, where Co and Ni are in the B sites ($ACo_xNi_{1-x}O_{3-\delta}$), x is typically $0.3 \leq x \leq 0.6$.

Using the electrically conductive oxide with a perovskite structure of such an elemental composition can be particularly advantageous for realizing both the effect of suppressing the increase in cell temperature at the time of overcharge and the effect of suppressing the generation of gas during high-rate charging and discharging under high-temperature conditions.

The configuration of the base portion (main body portion of the positive electrode active material particle) which is the object of forming the coating portion formed of such a coating portion-constituting oxide is not particularly limited, and the base portion can be from a lithium transition metal complex oxide of a variety of crystal structures such as a layered rock-salt structure, rock-salt structure, spinel structure, and perovskite structure. The crystal structure of the lithium transition metal complex oxide can be determined, for example, by the conventional well-known X-ray diffraction measurements.

As an example, a lithium transition metal complex oxide having a layered rock-salt structure or spinel structure can be used. Specific examples include ternary lithium-containing complex oxides such as a lithium-nickel complex oxide (for example, $LiNiO_2$), lithium-cobalt complex oxides (for example, $LiCoO_2$), lithium-manganese complex oxides (for example, $LiMn_2O_4$), and lithium-nickel-cobalt-manganese complex oxide (for example, $LiNi_{1/3}Co_{1/3}Mn_{1/3}O_2$). Lithium transition metal complex oxides including a transition metal element other than Ni, Co, and Mn, a typical metal element, and the like, in the same manner as in the conventional composition, may be also used.

A polyanion compound such as represented by the general formula of $LiMPO_4$, $LiMVO_4$, or $Li_2MSiO_4$ (M in the formulas is at least one or more elements from among Co, Ni, Mn, and Fe) may be also used as the positive electrode active material.

The average particle diameter of the positive electrode active material particles (secondary particles) may be generally 1 μm or more to 25 μm or less. With the positive electrode active material particles (base portion) of such an average particle diameter, satisfactory cell performance can be demonstrated with better stability. The specific surface area is 0.1 m²/g or more (typically, 0.5 m²/g or more) to 20 m²/g or less (typically, 10 m²/g or less). With the positive electrode active material particles of such a structure, high cell characteristics (for example, a high output characteristic) can be demonstrated even in a state where the coating portion of the above-described configurations is formed on the surface of the particles.

The "average particle diameter" herein is a particle diameter (D50, also referred to as median diameter) corresponding to cumulative 50 vol. % from the fine particle side with a small particle diameter in a volume-standard granulometric distribution based on the general laser diffraction-light scattering method. The "specific surface area" is a surface area (BET specific surface area) measured by a BET method (for example, BET one-point method) by using nitrogen gas.

The positive electrode active material layer 14 can be formed by attaching a composition prepared by mixing the positive electrode active material, which is to be provided with the above-described coating portion on the surface thereof, together with various additives (for example, a paste-like (slurry-like) supply material prepared by adding a nonaqueous solvent, or a granulated material obtained by granulating the positive electrode active material together with the additives) to the positive electrode collector 12 to obtain a predetermined thickness.

Examples of the additives included in addition to the positive electrode active material contained in the positive electrode active material layer include an electrically conductive material and a binder. The additives which have been conventionally used in the lithium ion secondary cells of this type may be used without any particular limitation. For example, a carbon powder such as carbon black or a carbon material such as carbon fibers can be used as the electrically conductive material. When a nonaqueous supply material is used to form the positive electrode active material layer 14 with a paste-like (slurry-like) supply material, a polymer material soluble in organic solvents can be used as the binder, examples thereof including halogenated vinyl resins such as polyvinylidene fluoride (PVDF) and polyvinylidene chloride (PVDC), and polyalkylene oxides such as polyethylene oxide (PEO). When an aqueous supply material is used, the binder can be a water-soluble polymer material or a water-dispersible polymer material such as polytetrafluoroethylene (PTFE), carboxymethyl cellulose (CMC), and styrene-butadiene rubber (SBR).

Meanwhile, similarly to the positive electrode sheet 10, the negative electrode sheet 20 also has a configuration in which a negative electrode active material layer 24 having the negative electrode active material as the main component is provided on both surfaces of an elongated sheet-shaped negative electrode collector. However, the negative electrode active material layer 24 is not provided at one side edge in the lateral direction (that is, one end portion in the winding axis direction, which is the end portion on the side opposite that of the positive electrode active material non-formation portion 16) of the negative electrode 20, and a negative electrode active material layer non-formation portion 26 is formed in which the negative electrode collector 22 is exposed over a certain width.

In the nonaqueous electrolytic solution secondary cell disclosed herein, materials suitable as the positive electrode active materials for the secondary cell of this type can be used individually or in combinations of two or more thereof (as mixtures or complex configurations).

For example, carbon materials such as graphite, hardly graphitizable carbon (hard carbon), easily graphitizable carbon (soft carbon), carbon nanotubes, or materials having a structure in which those materials are combined can be used. In particular, a graphite material can be used. For example, a graphite material coated on the surface with amorphous carbon can be used.

The form of the graphite material to be used as the negative electrode active material is not particularly limited, and the so-called flaky graphite or spherical graphite particles may be use. The average particle diameter of graphite particles is not particularly limited, and particles with a diameter of about 5 μm or more to 50 μm or less can be used.

The negative electrode active material layer 24 can be formed by attaching a composition prepared (for example, a paste-like (slurry-like) supply material prepared by adding an aqueous solvent or a nonaqueous solvent, or a granulated material) by mixing the negative electrode active material, such as described hereinabove, together with other additives to the negative electrode collector 22 to obtain a predetermined thickness.

A binder is an example of the additive. For example, a binder same as that contained in the above-described positive electrode active material layer 14 can be used. A thickening agent, a dispersant and the like can be used, as appropriate, as other additives. For example, carboxymethyl cellulose (CMC) and methyl cellulose (MC) can be used as the thickening agent.

The separator 40 which is laminated together with the positive electrode sheet 10 on which the positive electrode active material layer 14 has been formed using the above-described material and the negative electrode sheet 20 on which the negative electrode active material layer 24 has been formed using the above-described material is a member that separates the positive electrode sheet 10 and the negative electrode sheet 20.

The separator 40 is typically configured of a band-shaped sheet material of a predetermined width having a plurality of fine holes. A separator of a single-layer structure or a separator of a laminated structure configured of a porous polyolefin resin, for example, such as polypropylene (PP) and polyethylene (PE) can be used as the separator 40. An inorganic filler layer having electric insulating properties (for example, a heat-resistant layer formed of a filler such as a metal oxide and a metal hydroxide) may be formed on the surface of a sheet material configured of such a resin.

During the lamination, the positive electrode sheet 10 and the negative electrode sheet 20 are superimposed with a certain shift in the width direction such that the positive electrode active material layer non-formation portion 16 of the positive electrode sheet 10 and the negative electrode active material layer non-formation portion 26 of the negative electrode sheet 20 project from respective sides of the separator sheet 40 in the width direction. As a result, the active material layer non-formation portions 16, 26 of the positive electrode sheet 10 and the negative electrode sheet 20 project to the outside from the wound core portion (that is, a portion where the positive electrode active material layer formation portion of the positive electrode sheet 10, the negative electrode active material layer formation portion of the negative electrode sheet 20, and the two separator sheets 40 are tightly wound together) in the transverse direction with respect to the winding direction of the wound electrode body 80. A positive electrode lead terminal 74 and a negative electrode lead terminal 76 are attached to the projecting portion (that is, to the non-formation portion of the positive electrode active material layer) 16 on the positive electrode side and the projecting portion (that is, to the non-formation portion of the negative electrode active material layer) 26 on the negative electrode side, respectively, and electrically connected to the positive electrode terminal 70 and the negative electrode terminal 72, respectively.

Nonaqueous electrolytes same as those that have been used in the conventional lithium ion secondary cells can be used without any particular limitation as the nonaqueous electrolyte (typically, nonaqueous electrolytic solution). A typical nonaqueous electrolytic solution has a composition including a support salt in an appropriate nonaqueous solvent. For example, one or two or more selected from ethylene carbonate, propylene carbonate, dimethyl carbonate, diethyl carbonate, ethyl methyl carbonate, 1,2-dimethoxyethane, 1,2-diethoxyethane, tetrahydrofuran, and 1,3-dioxolane can be used as the nonaqueous solvent. Solvents obtained by fluorination of the carbonate solvents such as described hereinabove, can be also used, examples thereof including fluorinated cyclic carbonates such as monofluoroethylene carbonate (FEC) and fluorinated chain carbonates such as methyl-2,2,2-trifluoroethyl carbonate (MT-FEC).

A lithium salt, for example, such as $LiPF_6$, $LiBF_4$, $LiAsF_6$, $LiCF_3SO_3$, $LiC_4F_9SO_3$, $LiN(CF_3SO_2)_2$, and $LiC(CF_3SO_2)_3$, can be used as the support salt. For example, a nonaqueous electrolytic solution can be used in which $LiPF_6$ is contained at a concentration of about 1 mol/L in a mixed solvent of ethylene carbonate (EC), dimethyl carbonate (DMC), and ethyl methyl carbonate (EMC) (for example, at a volume ratio of 3:4:3).

When the nonaqueous electrolytic solution secondary cell (lithium ion secondary cell) 100 according to the present embodiment is assembled, the wound electrode body 80 is accommodated inside the case main body 52 from an upper end opening of the main body 52, and an appropriate nonaqueous electrolytic solution is disposed (poured) in the case main body 52. The opening is then sealed, for example, by welding with the lid 54, thereby completing the assembly of the lithium ion secondary cell 100 according to the present embodiment. The process of sealing the case 50 and the process of disposing (pouring) the electrolytic solution are the same as those performed in the production of the conventional lithium ion secondary cells and do not characterize the present invention. The construction of the nonaqueous electrolytic solution secondary cell (lithium ion secondary cell) 100 according to the present embodiment is thus completed.

Several test examples relating to the present invention will be explained hereinbelow, but the present invention is not intended to be limited to the features described in the test examples.

<Fabrication of Positive Electrode Active Material ($LiNi_{1/3}Co_{1/3}Mn_{1/3}O_2$)>

Positive electrode active materials for lithium ion secondary cells of the samples shown in Tables 1 to 3 below were fabricated. First, sulfates of Ni, Co, and Mn, which were the constituent metal elements other than Li, were dissolved in predetermined amounts in distilled water. Then, the obtained aqueous solutions were neutralized by adding a basic aqueous solution with a pH of 11 to 14 (for example, an aqueous solution of NaOH), hydroxides including the metal elements were precipitated and a sol-like starting material hydroxide (precursor) was obtained.

This precursor was then mixed with a Li supply source (in this case, lithium carbonate), and the mixture was calcined for about 15 h at 900° C. After cooling, pulverization was performed to obtain a positive electrode active material made of $LiNi_{1/3}Co_{1/3}Mn_{1/3}O_2$ with an average particle diameter of about 10 μm (sample 1).

<Fabrication of Positive Electrode Active Material Provided with a Coating Layer>

An aqueous solution was then prepared in which one or a plurality of starting material metal salts corresponding to the oxide(s) for forming the coating layer were mixed at a predetermined mole ratio. For example, when $LaCoO_3$ of sample 3 was used as an oxide for forming the coating layer, a lanthanum salt (for example, a sulfate) and a cobalt salt (for example, a sulfate) were added at a molar ratio of 1:1 to prepare an aqueous solution including those metals.

Then, the positive electrode active material particles (LiNi$_{1/3}$Co$_{1/3}$Mn$_{1/3}$O$_2$) were added to the prepared aqueous solution. As for the amount added, the components were mixed at a ratio such that the total amount (molar amount) of the constituent elements, other than oxygen, in the oxide for forming the coating layer was 2 with respect to 100 of the total constituent metal element amount (molar amount), except for Li, of the positive electrode active material.

The mixture was then heated, the temperature was raised to 60° C., and the solvent was removed, thereby forming the precursor of the oxide for forming the coating layer on the surface of the positive electrode active material particles (LiNi$_{1/3}$Co$_{1/3}$Mn$_{1/3}$O$_2$). The obtained powder was then calcined by heating for 5 h at 450° C., and positive electrode active materials in which the coating portions formed of predetermined oxides were formed on the surface of the base portion (LiNi$_{1/3}$Co$_{1/3}$Mn$_{1/3}$O$_2$) of the positive electrode active material were obtained (samples 2 to 23: see Tables 1 to 3).

<Construction of Lithium Ion Secondary Cells>

First, a positive electrode of a lithium ion secondary cell which corresponded to each sample was fabricated by using the positive electrode active material of each sample shown in Tables 1 to 3.

More specifically, one of the fabricated positive electrode active materials was used, and acetylene black (AB) as an electrically conductive material, polyvinylidene fluoride (PVdF) as a binder (binding material), and a dispersant were weighed such as to obtain the mass ratio of these materials (in the order of description) of 80:8:2:0.2. These materials were then mixed with N-methyl pyrrolidone (NMP) to prepare a paste-like material for forming a positive electrode active material layer (solid fraction 56 wt %).

This material was uniformly coated on both surfaces of an aluminum foil (positive electrode collector), dried, and then subjected to compression treatment with a roll press to fabricate a positive electrode sheet.

A negative electrode for the lithium ion secondary cell was then fabricated. More specifically, a graphite material as a negative electrode active material, a SBR as a binder, and CMC as a thickening agent were weighed to obtain a mass ratio (in the order of description) of 98:1:1. These materials were mixed in water to prepare a paste-like material for forming a positive electrode active material layer. This material was uniformly coated on both surfaces of a copper foil (negative electrode collector), dried, and subjected to compression treatment with a roller press to fabricate a negative electrode sheet.

The fabricated positive electrode sheet and negative electrode sheet were wound together with a separator sheet to fabricate a flat-shaped wound electrode body. A porous resin sheet in which a polypropylene layer was laminated on both sides of a polyethylene layer was used as the separator sheet. Current collecting members were welded to both end portions (non-formation portions of the active material layers), in the width direction, of the flat-shaped wound electrode body, and the flat-shaped wound electrode body was then accommodated in a cell case in the form of a rectangular parallelepiped (see FIG. 1).

A mixed solvent was then prepared by mixing EC, DMC, and EMC at a volume ratio of 3:4:3. LiPF$_6$ as a support salt was dissolved to a concentration of 1.1 mol/L in the mixed solvent to prepare a nonaqueous electrolytic solution. Lithium ion secondary cells (samples 1 to 23: see Tables 1 to 3) using the positive electrode active materials of the samples shown in Tables 1 to 3 and corresponding to the respective samples were constructed by pouring the non-aqueous electrolytic solution in the cell case main body and then sealing the cell case with the lid.

<Activation Treatment and Measurement of Initial Capacity>

The fabricated lithium ion secondary cell of each sample was constant-current (CC) charged at a rate of 1/3 C to a voltage of 4.2 V under a temperature environment of 25° C. and then constant-voltage (CV) charged to a current value of 1/50 C to obtain a fully charged state (SOC 100%). The cell was then constant-current (CC) discharged at a rate of 1/3 C to a voltage of 3 V under a temperature environment of 25° C., and the CC discharge capacity at this time was taken as the initial capacity. Here, 1 C means a current value at which a cell capacity (Ah) predicted from the theoretical capacity of the active material can be charged within 1 h.

<Measurement of Cell Resistance>

The voltage of the lithium ion secondary cell of each sample was adjusted to 3.70 V. Each lithium ion secondary cell adjusted to a state with an open voltage of 3.70 V was CC discharged to a voltage of 3.00 V at a rate of 10 C under a temperature environment of 25° C. The cell resistance at of 25° C. was then calculated from the discharge current value and terminal voltage value at the 5-th second after the start of the discharge. The results are shown in the appropriate columns of Tables 1 to 3. The tables show relative values obtained when the cell resistance of the lithium ion secondary cell of sample 3 was taken as a reference (100).

<Measurement of Increase in Temperature at the Time of Overcharge>

The lithium ion secondary cell of each sample was charged to 4.1 V (SOC 100%) and then charged to an overcharge state (4.6 V). After a voltage of 4.6 V was reached, the cell was allowed to stand for 10 min, the surface temperature in the central portion of the side surface of the cell (corresponds to the central portion of the flat surface of the flat wound electrode body) was measured with a thermometer, and the difference in temperature (° C.) with the state before the overcharge was calculated. The results are shown in the appropriate columns of Tables 1 to 3.

<Measurement of Gas Generation Amount>

A cyclic durability test was conducted at 60° C. More specifically, the lithium ion secondary cell of each sample shown in Tables 2 and 3 was repeatedly (1000 cycles) charged and discharged at a high rate of 2 C. The sample cell was then immersed in an insulating oil, the cell case was opened, the gas generated inside the case was trapped with a measuring cylinder, and the volume of the gas was measured. The results are shown in the appropriate columns of Tables 2 and 3. The tables show the relative values obtained when the gas generation amount in the lithium ion secondary cell of sample 11 was taken as a reference (100%).

TABLE 1

| | Configuration of coating portion | Crystal structure | Cell resistance (relative value) | Increase in temperature at the time of overcharge (° C.) |
|---|---|---|---|---|
| Sample 1 | No coating portion | — | 148 | 40 |
| Sample 2 | RhO$_2$ | rutile | 146 | 35 |
| Sample 3 | LaCoO$_3$ | perovskite | 100 | 21 |
| Sample 4 | LaMnO$_3$ | perovskite | 123 | 33 |
| Sample 5 | SrCrO$_3$ | perovskite | 131 | 30 |
| Sample 6 | SrFeO$_3$ | perovskite | 122 | 35 |

TABLE 2

| | Coating portion (x) $LaCo_xMn_{1-x}O_3$ | Crystal structure | Cell resistance (relative value) | Increase in temperature at the time of overcharge (° C.) | Gas generation amount (%) |
|---|---|---|---|---|---|
| Sample 11 | 0 | perovskite | 123 | 30 | 100 |
| Sample 12 | 0.01 | perovskite | 101 | 25 | 101 |
| Sample 13 | 0.1 | perovskite | 100 | 21 | 105 |
| Sample 14 | 0.2 | perovskite | 103 | 23 | 107 |
| Sample 15 | 0.5 | perovskite | 99 | 22 | 105 |
| Sample 16 | 0.8 | perovskite | 98 | 24 | 107 |
| Sample 3 | 1.0 | perovskite | 100 | 21 | 120 |

TABLE 3

| | Coating portion (x) $LaCo_xNi_{1-x}O_3$ | Crystal structure | Cell resistance (relative value) | Increase in temperature at the time of overcharge (° C.) | Gas generation amount (%) |
|---|---|---|---|---|---|
| Sample 21 | 0 | perovskite | 125 | 40 | 101 |
| Sample 22 | 0.3 | perovskite | 110 | 28 | 103 |
| Sample 23 | 0.6 | perovskite | 102 | 25 | 110 |
| Sample 3 | 1.0 | perovskite | 100 | 21 | 120 |

As clearly indicated by the results in the tables, it was confirmed that in the lithium ion secondary cells of the samples in which the coating portion was configured of an electrically conductive oxide with a perovskite structure, the increase in cell resistance was suppressed as compared with the cell of sample 1 which did not have the coating portion or the cell of sample 2 in which the coating portion was configured of an oxide ($RhO_2$) with a rutile structure.

Further, it was confirmed that in lithium ion secondary cells of the samples in which the coating portion was configured of an electrically conductive oxide of a perovskite structure that included Co, the increase in temperature at the time of overcharge could be greatly suppressed.

Further, it was confirmed that in lithium ion secondary cells of the samples in which the coating portion was configured of an electrically conductive oxide with a perovskite structure that included Mn or Ni in addition to Co, a high effect of suppressing the gas generation was demonstrated even in a high-rate charging and discharging test performed under high-temperature conditions (in this case, 60° C.).

The present invention is explained hereinabove in detail, but the embodiments and test examples hereinabove are merely exemplary, and the invention disclosed herein is inclusive of various changes and modifications of the specific examples. As indicated hereinabove, the lithium ion secondary cell disclosed herein demonstrates excellent high-rate characteristic and durability. Therefore, such cell can be used, for example, as a drive power cell for a motor (electric motor) installed on a vehicle such as an automobile.

What is claimed is:

1. A positive electrode active material for use in a lithium ion secondary cell, comprising:
   a base portion formed of a lithium transition metal complex oxide capable of occluding and releasing lithium ions; and
   a coating portion formed on at least part of a surface of the base portion,
   wherein
   the coating portion includes an electrically conductive oxide with a perovskite structure which is represented by the following general formula:

$ACo_xM_{1-x}O_{3-\delta}$, where, in the formula, A is at least one element selected from among rare earth elements and alkaline earth metal elements, M is manganese or nickel, x is a real number satisfying $0.1 \leq x \leq 0.6$, and $\delta$ is an oxygen deficiency value for obtaining electrical neutrality.

2. The positive electrode active material according to claim 1, wherein
   x is a real number satisfying $0.1 \leq x \leq 0.5$.

* * * * *